SOLID STATE CHOPPER
Original Filed Sept. 10, 1963
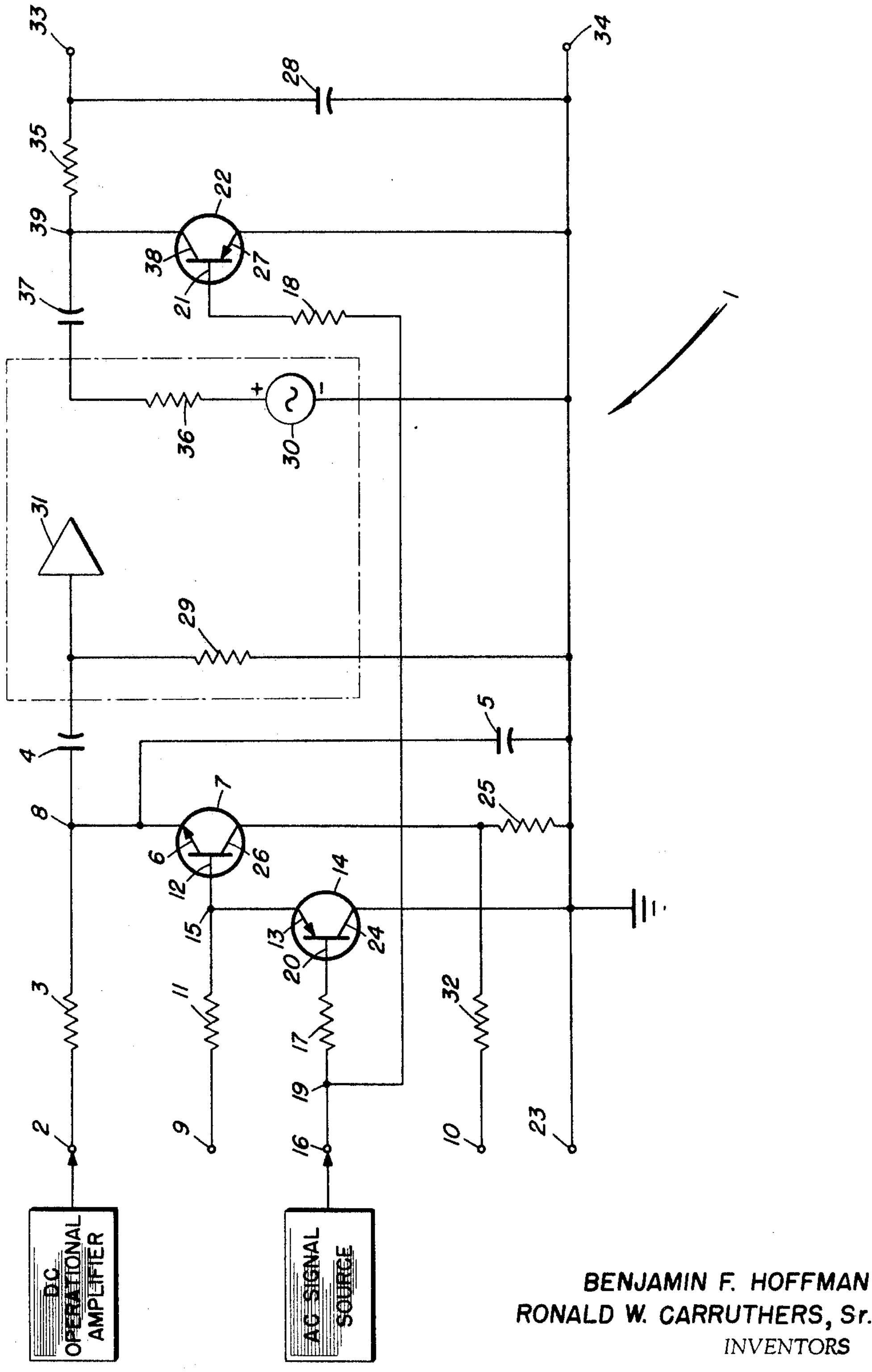
BENJAMIN F. HOFFMAN
RONALD W. CARRUTHERS, Sr.
INVENTORS
BY
Claude Funkhouser
ATTORNEY United States Patent Office 3,518,453
Patented June 30, 1970

3,518,453
SOLID STATE CHOPPER

Benjamin F. Hoffman, Hyattsville, and Ronald W. Carruthers, Sr., Baltimore, Md., assignors to the United States of America as represented by the Secretary of the Navy Substitute for abandoned application Ser. No. 308,045, Sept. 10, 1963. This application June 21, 1966, Ser. No. 562,422
Int. Cl. H03k 17/00
U.S. Cl. 307—240 3 Claims

ABSTRACT OF THE DISCLOSURE

A solid state chopper for use in conjunction with a compensation amplifier to provide D.C. stabilization. A first transistor, having its emitter connected to the base of a second transistor, and further having its base connected to an A.C. signal source, is provided. When the first transistor is driven into the cut-off state by the positive half-cycle of the A.C. signal source, the second transistor is driven into the saturation state, essentially grounding its emitter which is connected to a node that is resistively connected to a D.C. operational amplifier. When the first transistor is driven into the saturation state by the negative half-cycle of the A.C. signal source, the second transistor is driven into the cut-off state and has its base essentially grounded. Thus, the holding of the base of the second transistor near ground potential during the cut-off state eliminates leakage current, switching noise, and D.C. offsets.

This invention relates generally to chopper stabilized D.C. operational amplifiers and more specifically to an improved solid state chopper, to be used as a stabilizer in conjunction with a D.C. operational amplifier for missile autopilot application.

This application is a substitute for an abandoned application entitled Solid State Chopper, Ser. No. 308,045, filed Sept. 10, 1963.

Present day missile control systems require fast warm-up, preferably five seconds or less, D.C. operational amplifiers. It is natural, therefore, to consider transistors in the design of such amplifiers. However, when transistors are employed in the input circuit of a D.C. amplifier, a D.C. misalignment or offset problem is generated. This is especially true if the temperature environment to which the amplifier is subjected ranges from 0° C. to 100° C.

The main source of the misalignment may be attributed to the variation of transistor input current with temperature. A major contribution to this variation is the change in $Ic_{bo}$ of the transistor; changes in the latter quantity may be quite large as the temperature varies in the range of 0° C. to 100° C., of the order of 1.0 microampere for a silicon transistor. Such a current variation, as it reflects in the D.C. misalignment of the amplifier, cannot possibly be tolerated for some applications and certainly not in missile control systems.

The stabilization of wide-band direct current amplifiers for zero offset voltage and voltage drift can be obtained through the application of the Goldberg principle. Unfortunately, the Goldberg misalignment correction scheme does not compensate for input current variations; hence, some other means must be sought in order to reduce the misalignment to within tolerable limits.

In one type of solution to the problem the D.C. path between the amplifier input node and the transistor input circuit is blocked off by means of a high quality very high leakage resistance blocking capacitor. To provide a D.C. path a Goldberg compensating amplifier becomes a necessity. In some systems this method may be disadvantageous as the overload recovery time of the amplifier may be adversely affected by the presence of the blocking capacitor.

In another approach to the problem a vacuum tube is used to isolate the amplifier input node against transistor input current variations; the tube itself requires only a small amount of heater power. This approach is to be compared to the all-transistor amplifier which contains no effective isolation against transistor input current variations, with the attendant large misalignments, but has no heater power requirement. Many vacuum tubes inherently have low input grid current, including leakage current, and variations therein compared to the base current and variations therein for transistors. With care in design it is possible to maintain the grid current below 1.0 millimicroampere employing tubes produced more or less on a mass basis; the misalignment due to an input current of this magnitude is considered to be tolerable for missile work.

Besides the disadvantage of the heater power requirement, amplifiers employing vacuum tubes suffer from warm-up time difficulties. A warm-up time of the order of twenty seconds is required before it can really be stated that the tube has reached its "equilibrium" condition with respect to D.C. misalignment. Fortunately, the Goldberg compensation amplifier can help correct for misalignments occurring during the warm-up time interval; i.e., a large misalignment existing, say, after the first five or ten seconds effectively may be reduced to a much smaller value by the presence of the compensation amplifier. This statement holds if the compensation amplifier itself contains no vacuum tubes which would require a warm-up time interval, has sufficient gain, and does not have an unduly long filter time constant. Heating the tubes quickly by applying an over-voltage to the tube heaters for a short period of time may also reduce the warm-up period. In the future, the possibility exists that fast warm-up tubes, requiring no over-voltage, will be developed.

There is a lower limit below which there is no advantage in reducing tube warm-up time; this limit is set by the time constant of the very low frequency filter at the output of the Goldberg compensation amplifier. During warm-up, the operational amplifier becomes saturated and the filter capacitor may rapidly, in much less than one second, accumulate a relatively large charge because of diode action in the tube. This charge must be removed by an overload signal, passing through the chopper amplifier, which is rectified and passes through the filter resistance to the charged filter capacitor. That is, to cause recovery from the saturated condition and thus place the amplifier in the linear operating region, the correction signal may require a time of the order of the time constant of the filter. Hence, it appears that the lower limit for the warm-up time will be of the order of a filter time constant even with very fast heating tubes.

Of late the trend has been to replace the mechanical chopper, such as the Bristol Company Type 95908–21 BBM SPDT mechanical chopper, in chopper stabilized D.C. operational amplifiers, with its electronic solid state counterpart.

Advantages to be gained include long life, low chopper drive power and small physical size. Among the possible disadvantages of the solid state chopper are the generation of switching noise and the appearance of relatively high D.C. offsets with changing environment, such as temperature. With care in design, e.g., by using twin switching transistors in a balanced arrangement, a small offset change with environmental changes is possible. Proper design can also hold switching noise down to tolerable limits.

When dealing with choppers the question arises as to what constitutes a "good" chopper. It is natural to ask how choppers of different types will perform in a given circuit. Since a chopper is basically a two terminal switch, it may be characterized by how the switch appears between its two terminals when it is closed and when it is open. In the "closed" state, the switch looks like a small impedance in series with an undesired voltage offset generator. In the "open" state the switch looks like a small admittance in shunt with an undesired current offset generator. During the transit time, when the switch changes from one state to the other, "noise" appears across the switch terminals and this noise in general corrupts the performance of the circuit. The performance measures of a chopper are related to its two offset generators and its switching noise activity.

It is an object of this invention, therefore, to provide a solid state chopper to be used, as a stabilizer, in conjunction with a D.C. operational amplifier for missile autopilot applications.

It is another object of this invention to provide a chopper having a relatively long life, small physical size, and requiring low driving power.

It is a further object of this invention to provide a solid state chopper for missile autopilot applications having relatively low D.C. offsets with changing environment, such as temperature.

A still further object of this invention is to provide a solid state chopper wherein the switching noise is of a relatively low level.

And another object of this invention is to provide, in a solid state chopper, means for making the effects of leakage currents relatively insignificant.

Yet another object of this invention resides in the provision, in a solid state chopper for missile autopilot application, of means for supplying ground potential without critical balancing; hence, providing relatively simplified drive circuitry.

The attendant advantages of this invention will be better appreciated and said invention will become clearly understood by reference to the following detailed description and accompanying drawing wherein the figure is a simplified schematic diagram illustrating one embodiment of the instant invention.

Referring to the drawing in more detail, a solid state chopper employed in a compensation amplifier for stabilization against offset error voltages in D.C. operational amplifiers, in accordance with the Goldberg principle, is shown at 1. A D.C. input terminal is shown at 2 in series connection with a resistor 3. Said resistor 3 is connected in series with the parallel combination of coupling capacitor 4, capacitor 5, and emitter 6 of an npn transistor 7, such as a type 2N917; the junction of said resistor 3, capacitors 4 and 5, and emitter 6 forming the node 8.

Power is supplied to said chopper network 1 from a DC power supply by applying a potential of +48 v., with respect to ground, to a terminal 9 and −48 v., with respect to ground, to a terminal 10. The terminal 9 is connected in series with a resistor 11, and said resistor 11 is connected in series with the parallel combination of the base 12 of the transistor 7 and the emitter 13 of a pnp transistor 14, such as a type 2N1234, at a node 15.

A 400 c.p.s. 26 v. RMS signal, with respect to ground, is applied to a terminal 16. Said terminal 16 is connected in series with a parallel combination of resistors 17 and 18 which junction at the node 19. The resistor 17 is connected in series with the base 20 of the transistor 14, and the resistor 18 is connected in series with the base 21 of a pnp transistor 22, such as a type 2N1234.

Ground is applied at a terminal 23, to which are connected the collector 24 of the transistor 14, a collector biasing resistor 25, for biasing the collector 26 of transistor 7, one terminal of the capacitor 5, the collector 27 of the transistor 22, one terminal of a low pass filter capacitor 28, and the equivalent input impedance represented by a resistor 29, and one terminal of an equivalent voltage generator 30 of an AC amplifier 31.

The terminal 10 is connected to one terminal of a resistor 32, the other terminal of said resistor 32 being connected between the biasing resistor 25 and the collector 26.

The output of the chopper amplifier is taken across the capacitor 28 at terminals 33 and 34, with terminal 34 being at ground potential. Said terminal 33 is in series connection with a low pass filter resistor 35. The equivalent output resistance 36 of the A.C. amplifier 31 is connected in series with the equivalent voltage generator 30 and a capacitor 37.

The collector 38 of the transistor 22 is connected between the capacitor 37 and the resistor 35 so that said collector 38 and the resistor 35, in parallel combination, are in electrical series relationship with the capacitor 37. Terminals of the capacitor 37, the resistor 35, and the collector 38 junction at the node 39.

A D.C. offset error voltage is applied to the terminal 2 from a D.C. operational amplifier. At the same time, a 26 v. RMS 400 c.p.s. A.C. signal is applied to the terminal 16. When said A.C. signal half-cycle is positive it "opens" the transistor 14 which acts as a chopper driver switch, i.e., the transistor 14 is essentially operating in the cutoff state. When said applied A.C. signal half-cycle is negative the emitter 13-base 20 junction of the transistor 14 is forward biased and said transistor 14 is driven into the closed or saturation state. In a like manner the transistor 22, or output chopper, is driven into the cutoff state, or "opened," when said A.C. signal half-cycle is positive, and when said A.C. signal half-cycle is negative the emitter 27-base 21 junction of the transistor 22 is forward biased and said transistor 22 is driven into the "closed" or saturation state, essentially grounding the node 39. As mentioned hereinabove, the transistor 7, or input chopper, is an NPN transistor as compared to the transistors 14 and 22 which are PNP transistors.

As such, and in consequence of its manner of connection previously described, when the transistor 14 is driven into the open state negligible current flows through the resistor 11, thus creating a relatively high potential at the node 15 and forward biasing the base 12-emitter 6 junction of the transistor 7 and driving said transistor 7 into the "closed" or saturation state, thus essentially grounding the node 8. When the transistor 14 is driven into the "closed" or saturation state appreciable current flows through the resistor 11 and the node 15 is essentially grounded and said base 12-emitter 6 junction of the transistor 7 is no longer forward biased, even when the polarity of the relatively small magnitude D.C. input signal is negative, and the transistor 7 is driven into the open or cutoff state. A major advantage evident from the above teachings is that the base 12 of the transistor 7, the input chopper, is held very near ground potential during the open state, thereby reducing to insignificance the effects of leakage currents, $Ic_0$ and $Ie_0$ (the primary contributions to the input chopper, equivalent current offset generator).

Since transistors are not ideal switches, i.e., noise appears in their transition from one state to another, the capacitor 5 is connected, in a heretofore-mentioned manner, to filter out the small amount of noise that remains in spite of holding down the leakage current as described above.

The nodes 8 and 39, assuming ideal switching action, are alternately shunted to ground at the frequency, 400 cycles per second, of the signal impressed at the terminal 10, thus providing the input and output chopping functions.

By virtue of the alternate shunting to ground of the node 8, at positive half-cycles of said A.C. signal at the terminal 16, the D.C. offset signal applied at the terminal 2 is chopped and appears as a square wave which is passed through the coupling capacitor 4 to the A.C. amplifier 31.

The A.C. amplifier 31 is a positive gain amplifier, i.e., it amplifies said impressed square wave but does not reverse it (shift its phase by 180°). The amplifier output is represented by its equivalent voltage generator 30 in series with its equivalent output resistance 36. When the polarity of the generator 30 is positive with respect to ground the transistor 22 is in the "closed" or saturated state and the node 39 is essentially shunted to ground; the capacitor 37 is now charging. When the polarity of the generator reverses (every half-cycle) the transistor 22 or output chopper is switched to the "open" (cutoff) state; the capacitor 37 now discharges in the direction of the signal from the generator 30 so as to add to it, and the resultant signal is impressed across the low pass filter capacitor 28 which averages the impressed signal so that its D.C. or average value appears across the output terminals 33 and 34.

It is to be emphasized at this point that the polarity of the D.C. output signal is now opposite to that of the D.C. offset signal applied to terminal 2 from said D.C. operational amplifier, and this reverse polarity D.C. output is fed back to the said D.C. operational amplifier in accordance with the Goldberg principle of stabilizing D.C. amplifiers against offset voltages and drift.

Some additional advantages of this invention include:

(1) Unbalanced supply, i.e., ground is supplied without critical balancing; hence, simplified drive circuitry is possible.

(2) The inverted operation of transistor 7 results in the lowest possible chopper voltage offset (in the "on" state).

(3) The normal operation of the transistor 22 permits the use of low drive current required to attain the closed state.

(4) The manner of connection hereinabove described provides the capability of driving "*n*" independent transistors with the same reference source.

It can readily be seen that many variations and modifications of the instant invention are possible in the light of the above teachings. It is therefore to be understood that within the scope of the appended claims the present invention may be practiced in a manner otherwise than is specifically described herein.

What is claimed is:

1. A stable amplifier for direct-current input signals, including amplifying means for amplifying an alternating-current voltage to produce an amplified voltage, a D.C. operational amplifier, an input chopper transistor capable of operating in a saturation state and a cut-off state for changing the direct-current input signal into an alternating-current signal, said input chopper transistor having a base, a collector and an emitter, said emitter being connected to said D.C. operational amplifier so as to receive error signals therefrom, means for driving said chopper transistor alternately into the cut-off and saturation states while short circuiting the base of said chopper transistor to ground during its cut-off state operation, rectifying means for rectifying the output signal from said alternating-current amplifying means in order to provide an error correcting D.C. feedback signal to said D.C. operational amplifier, and an alternating-current signal source connected to the input of said chopper driving means for actuating said chopper driving means.

2. In a compensation amplifier for use in the stabilization of D.C. operational amplifiers an improved solid state chopper network, including an A.C. signal source, a chopper driver transistor having a base connected to said A.C. signal source and a collector connected to ground, an input chopper transistor having a base connected to the emitter of said chopper driver transistor, a collector resistively coupled to ground and an emitter connected to a D.C. operational amplifier so as to receive error signals therefrom, a positive gain A.C. amplifier connected to said input chopper transistor for amplifying output signals therefrom without changing their phase, and an output chopper transistor operatively connected to said A.C. amplifier for rectifying signals received therefrom in order to provide an error correcting D.C. feedback signal to a D.C. operational amplifier, and having a base resistively coupled to said A.C. signal source and an emitter coupled to ground, whereby during the positive half cycle of the signal from said A.C. signal source said chopper driver transistor is essentially operating in the cut-off state and during the negative half cycle of said A.C. signal source output signal said chopper driver transistor is driven into the saturation state, said output chopper transistor being driven into the cut-off state during the positive half cycle of said A.C. signal source voltage and into the saturation state during the negative half cycle of said A.C. signal source voltage, so that when said chopper driver transistor is driven into the cut-off state said input chopper transistor is driven into the saturation state for essentially grounding its emitter, and when said chopper driver is driven into the saturation state said input chopper transistor is driven into the cut-off state and its base essentially grounded, for eliminating leakage current switching noise and D.C. offsets.

3. A solid state chopper to be used as a stabilizer in conjunction with a D.C. operational amplifier for missile autopilot application, comprising a D.C. power supply, a transistor, having an emitter and a base, operatively connected within said chopper stabilizer so as to receive signals from said D.C. operational amplifier, and provide the input chopping function therefor, a transistor having a collector, operatively connected within said chopper stabilizer so as to provide the output chopping function, a transistor operatively connected between the base of said input chopper transistor and ground and functioning to drive said input chopper alternately between the saturated and cut-off states while operating to hold the base of said input chopper transistor very near zero potential during the cut-off state so as to reduce to insignificance the effects of leakage current, said chopper driver transistor further serving to hold down switching noise incident to the change of state of said input chopper, an A.C. signal source operatively connected to said chopper driver transistor and said output chopper transistor so as to provide the activating signal to said chopper driver transistor and said output chopper transistor and determine the reference frequency at which said input chopper transistor emitter, and said output chopper transistor collector will be alternately shunted to ground and the frequency at which the base of said input chopper transistor will be shunted to ground, and a positive gain A.C. amplifier having its input connected to the output of said input chopper and its output connected to the input of said output chopper, whereby said A.C. amplifier will receive a square wave signal from said input chopper and provide an amplified square wave output to said output chopper in phase with said square wave input signal.

References Cited

UNITED STATES PATENTS

| | | | |
|---|---|---|---|
| 2,970,276 | 1/1961 | Dollinger | 330—9 |
| 3,237,117 | 2/1966 | Collings et al. | 330—9 |
| 3,331,969 | 7/1967 | King | 330—10 |
| 3,381,144 | 4/1968 | Thomas | 307—254 |

DONALD D. FORRER, Primary Examiner

R. C. WOODBRIDGE, Assistant Examiner

U.S. Cl. X.R.

307—229, 254; 330—9, 10